United States Patent [19]

Perzl

[11] Patent Number: 5,034,960
[45] Date of Patent: Jul. 23, 1991

[54] ARRANGEMENT FOR THE INPUT OF ENERGY INTO A CONDUCTING ELECTRICAL GAS DISCHARGE, ESPECIALLY FOR A GAS LASER

[75] Inventor: Peter R. Perzl, Fürstenfeldbruck, Fed. Rep. of Germany

[73] Assignee: Heraeus Holding GmbH, Hanau am Main, Fed. Rep. of Germany

[21] Appl. No.: 519,169

[22] Filed: May 4, 1990

[30] Foreign Application Priority Data

May 6, 1989 [DE] Fed. Rep. of Germany ....... 3914921

[51] Int. Cl.⁵ ................................................. H01S 3/97
[52] U.S. Cl. ........................................ 372/87; 372/86; 372/61; 372/92
[58] Field of Search ..................... 372/61, 58, 86, 87, 372/92

[56] References Cited

U.S. PATENT DOCUMENTS

| | | | |
|---|---|---|---|
| 4,077,018 | 2/1978 | Fahlen et al. | 372/86 |
| 4,217,560 | 8/1980 | Kosyrev et al. | 372/87 |
| 4,342,114 | 7/1982 | Luck | 372/87 |
| 4,343,040 | 8/1982 | Shibayama et al. | 372/87 |
| 4,555,787 | 11/1985 | Cohn et al. | 372/86 |
| 4,606,035 | 8/1986 | Hishii et al. | 372/87 |

Primary Examiner—Léon Scott, Jr.
Attorney, Agent, or Firm—Felfe & Lynch

[57] ABSTRACT

A discharge chamber is swept at high velocity by a gas discharge which burns as a steady-field discharge between an anode extending in the direction of flow and at least three single cathodes arrayed in tandem in the direction of flow. The discharge chamber is defined transversely of the direction of flow by sidewalls, the anode forming the one first sidewall and running parallel to the plane defined by the single cathodes. To achieve a long cathode life at maximum power input, and especially to achieve sufficient cooling of the downstream single cathodes, without the need for additional technical measures and components, the second sidewall defining the discharge chamber on the side facing the single cathodes continuously varies in distance from the opposite first sidewall and the anode in the area of the single cathodes.

10 Claims, 2 Drawing Sheets

ARRANGEMENT FOR THE INPUT OF ENERGY INTO A CONDUCTING ELECTRICAL GAS DISCHARGE, ESPECIALLY FOR A GAS LASER

The present invention relates to an arrangement for the input of energy into a gas-swept electrical gas discharge, especially for a gas laser, having a discharge chamber through which a gas is flowing at high velocity between an input end and an exit end, and in which the gas discharge burns as a steady-field discharge between an anode extending in the direction of flow and a cathode opposite the anode. The cathode is composed of at least three individual cathodes arranged in tandem in the direction of flow, and the discharge chamber is defined in the direction of flow by walls, while the anode forms the one wall which runs parallel to the plane containing the individual cathodes.

A discharge system of this kind, in the form of a gas laser, is disclosed by German Federal Patent 28 56 328. This corresponds to U.S. Pat. No. 4,449,220, which is incorporated herein by reference. The electrode arrangement shown therein consists of a plate-like anode and a row of individual cathodes running parallel thereto in the form of massive rods which are disposed very close to one wall of the gas discharge chamber. The walls of the gas channel run parallel to one another, the chamber being formed by an anode elongated in the direction of flow. It is problematic in this arrangement, however, that each individual cathode—with the exception of the one arranged as the first cathode in the direction of flow—is situated in the wake of the one directly preceding it, i.e., in its backwash. These very hot backwashes are prone to instability, and the removal of heat from these individual cathodes is greatly impeded, so that, especially at the high power densities that are usually required, a heavy oxidation of the rods takes place. In molybdenum or tungsten rods, this effect is encountered increasingly beginning, for example, at about 600° C. In U.S. Pat. No. 4,449,220, a steady-field pre-ionization is furthermore described, which is created by a plurality of pin-like pre-ionization electrodes projecting from the wall of the discharge chamber. For the auxiliary discharge in the area of these pre-ionization electrodes a power of the order of 40% of the total input power is required.

To prevent excessive heating of the individual cathodes, use is often made of tubular cathodes, of copper for example, through which a coolant is pumped. Such an arrangement is disclosed in U.S. Pat. No. 4,077,081, wherein a gas laser is described in which the discharge chamber is surrounded by 3 individual electrodes through which a coolant constantly flows to remove the heat and give the cathodes a sufficiently long useful life. Experience shows, however, that the cathode life that can be achieved in this manner is not sufficient to satisfy industrial requirements. The object of the present invention is to configure a system for the input of energy into a gas-swept electrical gas discharge, especially for a gas laser of the kind described above, such that a long cathode life will be achieved under maximum power input, and especially such that sufficient cooling even of the downstream cathodes will be assured, without the need for additional technical measures and components for this purpose.

SUMMARY OF THE INVENTION

This object is achieved by the fact that, in the area where the individual cathodes are situated, the sidewall defining the discharge chamber on the side facing the individual has a portion adjacent to the cathodes which varies continuously in its distance from the opposite sidewall and anode.

In this system, sufficient free space is offered to the gas entering the discharge area to expand transversely of the direction of flow, so that a transverse component of the gas flow sweeps all sides, i.e., including the front and rear sides, of the individual cathodes situated in the area. There are no stagnant areas, i.e., areas not reached by the flowing gas.

These explanations apply to a system in which the gas channel widens in the direction of flow. In an alternative embodiment which differs from this divergent configuration, and in which the side wall converges toward the plane containing the individual cathodes, this convergent side wall forms a baffle which directs the gas flow between the individual cathodes and into the mainstream of the gas, so that in this case, too, the individual cathodes are swept on all sides by an always freshly cooled flow of gas. No additional measures are necessary for the cooling of these individual cathodes except for the slanting wall. The cooling is performed by the flowing gas alone. Depending on the geometrical requirements, a flat wall can be used as the flow deflector or divergent wall, although a curving wall is also conceivable for adapting the flow to the individual spacing between individual cathodes or to cathodes of different thickness. An arrangement of the side wall so as to diverge in the direction of flow, as described above, is always to be employed whenever there is a danger that, directly in front of these cathodes, a layer of gas heated by the individual cathode rods themselves might be entrained by the main flow and result in a partial degradation of the laser excitation and result in an impairment of the efficiency of the laser. The arrangement of this side wall so as to converge toward the individual cathodes should always be used when a sufficiently strong gas flow is available, since then the cooling effect is best and the useful life of the cathodes the longest.

The distance between the wall and each succeeding cathode in the direction of flow should vary by at least 30% of the diameter of the cathode next following in the direction of flow, so that the portion of the gas that flows past each cathode and reaches the cathode following it will divide around the latter cathode such that fresh cool gas will flow around it on both sides.

The diameter of the individual cathode should be between 2 mm and 6 mm in order, on the one hand, to achieve a complete cathode coverage (glow-discharge layer), and on the other hand to avoid interfering with the gas flow by having too great a cathode diameter.

A dielectric pre-ionizing auxiliary electrode disposed ahead of the first cathode in the direction of flow serves to create a low-resistance discharge path in the area of the first cathode upstream, since otherwise the main discharge would tend to burn mainly in the area of the downstream cathodes.

Arranging the pre-ionizing electrode so as to be equidistant between the cathode and the anode has the advantage that an auxiliary discharge burning between these electrodes will fill the entire space between the cathode and the anode transversely of the direction of flow of the gas, so that in the area in front of the main electrodes a uniform pre-ionization of all of the entering volume of gas will be obtained. The main discharge between the individual cathodes and the anode will thus find a completely pre-ionized discharge path ahead of it, so that the main discharge can be operated even at extremely low currents. The main discharge area is shifted upstream as compared with a system not using such a pre-ionizing electrode.

In an advantageous dimensional arrangement, adjacent single cathodes should be about 20 mm apart so that, in the case of an anode extending along a length of usually about 100 mm, five single cathodes will be used. Usually the first single cathode in the direction of flow is disposed at the level of the upstream edge of the anode, in which case, in the above dimensional arrangement, the anode will extend beyond the last single cathode in the direction of flow. The individual cathodes are preferably solid rods of tungsten or molybdenum.

The angle $\alpha$ between the anode and the tangents in the direction of flow at the wall on the cathode side at the level of the particular cathode is given $$\text{by } \alpha = \arctan \frac{d}{a}$$

d = diameter of the particular single cathode
and a = the distance away from the adjacent upstream cathode with an angle $\alpha$ between 5° and 20°.

With this system of dimensions the gas flows around the single cathodes such that, even if the conditions offered by the thermodynamics of the laser are exploited to the extreme, the cathodes will be sufficiently cooled.

DETAILED DESCRIPTION OF THE PREFERRED EMBODIMENT

Figure 1:
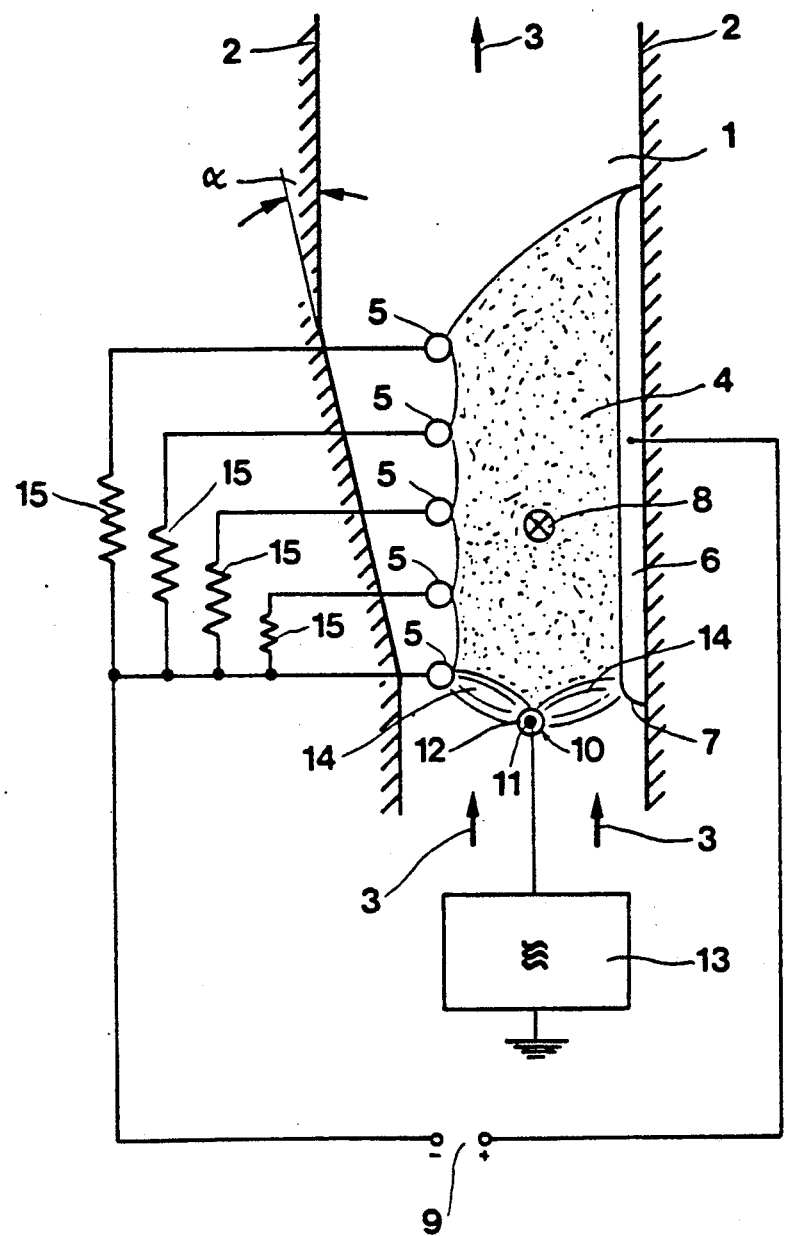
FIG. 1 shows a gas discharge chamber of a transverse-flow gas laser with a plurality of individual cathodes and their wiring, with a divergent discharge channel.

FIG. 1 shows a detail of a gas discharge channel 1 of a laser having a first sidewall 2 and second sidewall 22 which define the gas discharge chamber transversely of the gas flow, indicated by the arrow 3, in the main discharge area 4. The main discharge takes place between several single elongate cathodes 5 and an anode 6 extending in the direction of flow, the first single cathode 5 and the trailing edge 7 of the anode 6 lying at about the same level on either side of the direction of flow of the gas. The optical axis of the resonator is indicated by the arrow 8. The five single electrodes 5 are contained in a plane running parallel to the anode 6. Cathode 5 and anode 6 are connected to a DC power supply 9. The main electrodes 5 and 6, in the form of the cathode and anode, extend transversely of the gas flow, i.e., perpendicular to the plane of the drawing. A pre-ionizing electrode 10 is disposed ahead of the cathode 5 and anode 6 in the direction of flow of the gas, and is at the same distance from the anode 6 and from the cathode 5. The pre-ionizing electrode 10 consists of an electrically conductive core 11 which is surrounded by an envelope 12 of dielectric material; the dielectric material is fused vitreous silica.

The pre-ionizing electrode 10 is connected to an alternating current supply 13. Between this pre-ionizing electrode 10 and the main electrodes 5 and 6, an auxiliary discharge 14 burns uniformly over the entire width between the cathode 5 and the leading edge of anode 6 transversely of the direction of flow. In this manner the gas is completely and uniformly pre-ionized in the area of the auxiliary discharge 14 at the input end of the main electrodes 5 and 6. An immediate ignition of the main discharge 4 between the main electrodes 5 and 6 is obtained with a low consumption of energy. Even in the case of very low currents at the main electrodes 5 and 6, a stable main discharge 4 can be sustained.

The individual single cathodes 5 are at equal distances from one another and are connected each to the DC power source 9 through an input resistance 15, except for the first single cathode 5.

Figure 2:
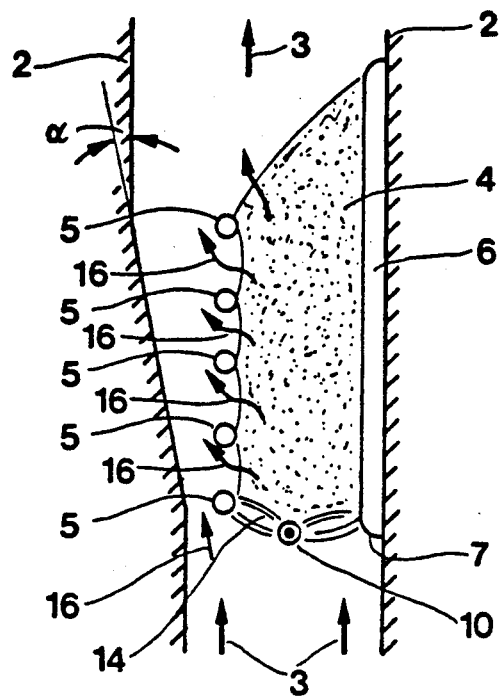
FIG. 2 shows the discharge channel of FIG. 1 with the conditions of flow occurring therein.

In embodiments corresponding to the description of FIGS. 1 and 2, the side wall 22 directly adjacent the single cathodes 5 is divergent from the plane excited by the single cathodes 5 and from the surface of the anode 6 which defines the channel on the opposite side. The divergent side wall 22 and the plane of the single cathodes 5 form an angle $\alpha$ of about 10°. On account of this arrangement of the side wall 22, the gas stream entering this area expands such that it flows around the individual cathodes 5, especially in the area between adjacent cathodes, as indicated by the arrows 16, since its volume is increased by the input of energy and the gas flow is thereby expanded. Constantly fresh and thus relatively cool gas flows past the outside surfaces of the single cathodes 5 and removes the heat occurring on the surfaces of the single cathodes 5. Since the density of the gas diminishes over the entire cross section of the discharge channel by about 50% from its entry into the divergent area to the area of the last single cathode, due to the above-described angle of the side wall 22, the result is a sufficient flow transversely of the direction of the main flow.

Figure 3:
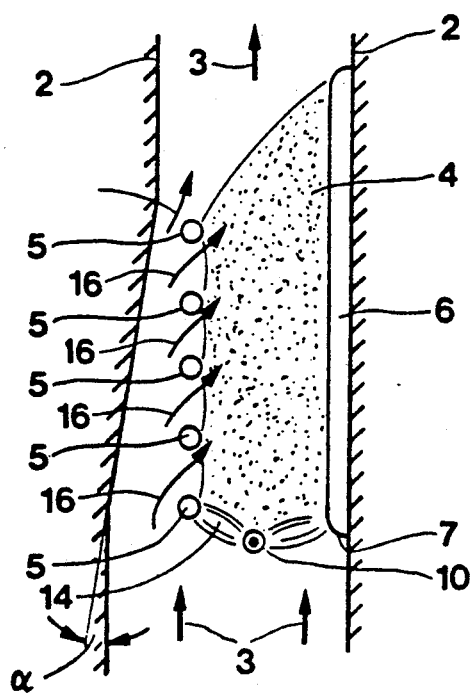
FIG. 3 shows a flow channel which is convergent, in contrast to FIGS. 1 and 2.

In an embodiment alternative to FIGS. 1 and 2, the channel in FIG. 3 is of a convergent configuration in the direction of gas flow 3, i.e., the side wall 22 adjacent the single cathodes 5 decreases in its distance from the excited plane from the first single cathode 5 to the last single cathode 5, the angle $\alpha$ enclosed by the plane containing the single cathodes 5 and this convergent side wall amounting, again, to 12°. While according to FIGS. 1 and 2 the single cathodes 5 are swept by the main stream toward the side wall 22, as indicated by the arrows 16, in the embodiment shown in FIG. 3 they are swept in the opposite direction, i.e., from the side wall 22 toward the main stream and thus into the area of the main discharge 4. In this embodiment too the single cathodes, i.e., all single cathodes from the first to the last cathode 5, are sufficiently swept by fresh, cooled gas, so that sufficient heat is removed from these single cathodes 5.

I claim:

1. Apparatus for the input of electrical energy into an active gas in a laser, said apparatus comprising
a gas discharge chamber through which said gas flows at high velocity, said chamber comprising an input end and an exit end defining a main direction of flow, and a first sidewall and an opposed second sidewall extending from said input end to said exit end, said second sidewall having a portion which varies continuously in its distance from said first sidewall in the main direction of flow, a planar anode against said first sidewall, a plurality of at least three elongate cathodes adjacent to said portion of said second sidewall, said cathodes being situated in tandem in a plane parallel to said anode and succeeding each other in the main direction of flow, therefore varying continuously in distance from said sidewall, means for applying a voltage between said cathodes and said anode to maintain a steady glow discharge of said active gas flowing therebetween, whereby, said gas also flows transversely of said main direction of flow so that each succeeding cathode in the direction of flow is exposed to gas which has not been heated by the preceding cathode.

2. Apparatus as in claim 1 wherein the distance between the second sidewall and each adjacent single cathode seen in the direction of flow varies by at least 30% of the diameter of the succeeding cathode seen in the main direction of flow.

3. Apparatus as in claim 1 wherein the diameter of the cathode is between 2 mm and 6 mm.

4. Apparatus as in claim 1 further comprising a pre-ionizing auxiliary electrode which is disposed ahead of the first cathode toward the input end.

5. Apparatus as in claim 4 wherein the anode has a leading edge toward said input end and the pre-ionizing auxiliary electrode is disposed equidistantly from the first cathode and the leading edge of the anode.

6. Apparatus as in claim 1 wherein the adjacent cathodes are spaced about 20 mm from one another.

7. Apparatus as in claim 1 wherein the direction of flow at said portion of said second sidewall directly opposite one of said cathodes from said anode is defined by a tangent to said portion of said sidewall, said tangent forming an angle $\alpha$ with said anode given by $$\alpha = \arctan \frac{d}{a}$$

where d is the diameter of said one of said cathodes and a is the distance of said one of said cathodes from the adjacent cathode toward said input end, said angle $\alpha$ being between 5° and 20°.

8. Apparatus as in claim 7 wherein said cathodes are of uniform diameter and uniformly spaced, whereby $\alpha$ is uniform along said portion of said sidewall adjacent said cathodes and said portion is planar.

9. Apparatus as in claim 1 wherein the cathodes are solid rods.

10. Apparatus as in claim 1 wherein the cathodes are made from one of tungsten and molybdenum.

* * * * *

UNITED STATES PATENT AND TRADEMARK OFFICE
CERTIFICATE OF CORRECTION

PATENT NO. : 5,034,960

DATED : July 23, 1991

INVENTOR(S) : Peter R. Perzl

It is certified that error appears in the above-identified patent and that said Letters Patent is hereby corrected as shown below:

Column 1, line 52, delete "4,077,081" and insert --4,077,018--.

Column 2, line 6, after "individual" insert --cathodes--.

Signed and Sealed this

Twenty-second Day of June, 1993

*Attest:*

*Attesting Officer*

MICHAEL K. KIRK

*Acting Commissioner of Patents and Trademarks*